(12) United States Patent
Carrion

(10) Patent No.: US 9,839,866 B2
(45) Date of Patent: Dec. 12, 2017

(54) FILTER ELEMENTS AND METHODS FOR FILTERING FLUIDS

(71) Applicant: Pall Corporation, Port Washington, NY (US)

(72) Inventor: Alexander Carrion, Tampa, FL (US)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 14/292,030

(22) Filed: May 30, 2014

(65) Prior Publication Data

US 2015/0343341 A1    Dec. 3, 2015

(51) Int. Cl.
    *B01D 29/58* (2006.01)
    *B01D 29/21* (2006.01)
    *B01D 29/23* (2006.01)
    *B01D 29/54* (2006.01)

(52) U.S. Cl.
    CPC .............. *B01D 29/58* (2013.01); *B01D 29/21* (2013.01); *B01D 29/232* (2013.01); *B01D 29/54* (2013.01); *B01D 2201/0415* (2013.01); *B01D 2201/298* (2013.01)

(58) Field of Classification Search
    CPC .. B01D 46/521; B01D 46/523; B01D 46/526; B01D 63/14; B01D 63/067; B01D 27/06; B01D 27/08; B01D 27/14; B01D 27/142; B01D 27/144; B01D 29/21; B01D 29/232; B01D 29/50; B01D 29/52; B01D 29/54; B01D 2201/12; B01D 2201/122; B01D 2201/125; B01D 2201/127
    See application file for complete search history.

(56) References Cited

U.S. PATENT DOCUMENTS

| 3,211,292 A | 10/1965 | Bull |
| 3,420,377 A * | 1/1969 | Vandersip .............. B01D 27/06 210/315 |
| 3,988,244 A * | 10/1976 | Brooks .................. B01D 27/06 210/317 |
| 4,507,200 A * | 3/1985 | Meissner ............... B01D 29/54 210/315 |

(Continued)

FOREIGN PATENT DOCUMENTS

| DE | 10 2009 034 348 A1 | 1/2011 |
| JP | 49-111080 U | 9/1974 |

(Continued)

*Primary Examiner* — Pranav N Patel
(74) *Attorney, Agent, or Firm* — Leydig Voit & Mayer

(57) ABSTRACT

A filter element has a filter structure and first and second end caps attached to the opposite ends of the filter structure. The filter structure includes an outer filter pack, an inner filter pack, and a helical support positioned between the outer and inner filter packs. The helical support may have flow channels and support ridges on the inner surface and the outer surface of the helical support. Unfiltered fluid may be directed outside-in through the outer filter pack and inside-out through the inner filter pack, the support ridges of the helical support supporting the outer and inner filter packs against the pinching forces associated with the pressure drops across the outer and inner filter packs. Filtrate may be directed axially along the flow channels of the helical support and discharged from the filter element.

14 Claims, 4 Drawing Sheets

(56) References Cited

U.S. PATENT DOCUMENTS

| | | | |
|---|---|---|---|
| 4,537,681 A * | 8/1985 | Argiropoulos | B01D 29/15 210/317 |
| 4,783,271 A * | 11/1988 | Silverwater | B01D 29/15 210/149 |
| 5,104,534 A | 4/1992 | Branchcomb | |
| 5,190,651 A * | 3/1993 | Spencer | B01D 29/111 210/305 |
| 5,232,595 A | 8/1993 | Meyer | |
| 5,252,207 A | 10/1993 | Miller et al. | |
| 5,543,047 A | 8/1996 | Stoyell et al. | |
| 5,628,909 A | 5/1997 | Bellhouse | |
| 5,779,886 A | 7/1998 | Couture | |
| 5,824,232 A | 10/1998 | Asher et al. | |
| 6,085,915 A * | 7/2000 | Schwandt | B01D 29/21 210/411 |
| 6,902,672 B2 | 6/2005 | Herron | |
| 7,108,139 B2 | 9/2006 | Nguyen | |
| 7,407,058 B2 | 8/2008 | Mertens et al. | |
| 7,854,329 B2 | 12/2010 | Malgorn et al. | |
| 8,075,720 B2 | 12/2011 | Fall et al. | |
| 8,147,693 B2 | 4/2012 | Terry et al. | |
| 8,764,984 B2 | 7/2014 | Curt et al. | |
| 2005/0258092 A1 * | 11/2005 | Mertens | B01D 29/15 210/483 |
| 2006/0219635 A1 | 10/2006 | McCague et al. | |
| 2007/0289915 A1 * | 12/2007 | Jiang | B01D 27/06 210/338 |
| 2008/0245719 A1 * | 10/2008 | Beard | B01D 29/114 210/235 |
| 2009/0020472 A1 | 1/2009 | Lucas et al. | |
| 2012/0199529 A1 | 8/2012 | Dewes | |

FOREIGN PATENT DOCUMENTS

| | | |
|---|---|---|
| JP | 2013-509996 A | 3/2013 |
| WO | WO 2005/082484 A1 | 9/2005 |
| WO | WO 2007/140247 | 12/2007 |

* cited by examiner

FILTER ELEMENTS AND METHODS FOR FILTERING FLUIDS

DISCLOSURE OF THE INVENTION

The present invention relates to filter elements and methods for filtering fluids. Filter elements embodying the invention include a generally cylindrical filter structure having an outer hollow filter pack mounted around an inner hollow filter pack and end caps on opposite ends of the filter structure. Methods embodying the invention include passing unfiltered fluid through the outer and inner filter packs simultaneously in opposite radial directions. Each filter pack has a filter medium which removes any of a wide variety of undesirable substances from the unfiltered fluid flowing through the filter pack. The filter packs thus produce a filtered fluid, known as filtrate or permeate, which has little or none of the undesirable substance(s).

In accordance with one aspect of the invention, filter elements include a filter structure and first and second end caps attached to first and second ends of the filter structure. The filter structure has a generally cylindrical inner filter pack which includes a filter medium, a generally cylindrical outer filter pack which includes a filter medium, and a generally cylindrical helical support. The outer filter pack is positioned around the inner filter pack, and the helical support is positioned between the outer and inner filter packs. The helical support has an inner surface, an outer surface, and several support ridges and flow channels on the inner and outer surfaces. These support ridges and flow channels extend generally helically along the inner and outer surfaces of the helical support, and each support ridge has a generally arch-shaped configuration. The arch-shaped support ridges on the outer surface of the helical support contact the inner periphery of the outer filter pack, and the arch-shaped support ridges on the inner surface of the helical support contact the outer periphery of the inner filter pack. A first opening in at least one of the end caps fluidly communicates between flow channels of the helical support and the exterior of the filter element. A second opening in at least one of the end caps fluidly communicates between the interior of the inner filter pack and the exterior of the filter element.

In accordance with another aspect of the invention, methods for filtering fluids include directing unfiltered fluid along a longitudinal axis into a hollow interior of a cylindrically shaped inner filter pack and passing the unfiltered fluid generally radially outwardly through the inner filter pack. Passing unfiltered fluid through the inner filter pack includes passing the unfiltered fluid through a filter medium to remove one or more substances from the unfiltered fluid and provide a filtrate at the outer periphery of the inner filter pack. Methods for filtering fluids also include passing unfiltered fluid generally radially inwardly through an outer filter pack that surrounds the inner filter pack. Passing unfiltered fluid through the outer filter pack includes passing unfiltered fluid through a filter medium to remove one or more substances from the unfiltered fluid and provide a filtrate at the inner periphery of the outer filter pack. Methods embodying the invention further include passing filtrate from the outer periphery of the inner filter pack along a plurality of flow channels which extend helically along an inner surface of a helical support positioned between the inner and outer filter packs. Passing the filtrate along the inner surface of the helical support includes passing the filtrate helically along the flow channels to at least one end of the helical support and discharging the filtrate from the flow channels. Methods embodying the invention additionally include passing filtrate from the inner periphery of the outer filter pack along a plurality of flow channels which extend helically along an outer surface of the helical support. Passing filtrate along the outer surface of the helical support includes passing the filtrate helically along the flow channels to at least one end of the helical support and discharging the filtrate from the flow channels.

Filter elements and methods embodying the invention offer many significant advantages. For example, by providing a filter element with two smaller filter packs instead of one large filter pack, the resistance to fluid through each smaller filter pack is lower. The smaller filter packs may then have additional filter media, more effectively utilizing the space within the filter element while still providing a lower initial pressure drop through a clean filter element, highly efficient filtration, and enhanced dirt capacity and service life over time. Further, the arch-shaped support ridges significantly improve the structural integrity of the helical support and enhance the support it provides the inner and outer filter packs. Consequently, the helical support may be fashioned from thinner, lighter polymeric materials and may obviate the need for additional structural supports for the filter packs, reducing the weight and the environmental impact of the filter element.

DETAILED DESCRIPTION OF EXEMPLARY, NON-LIMITING EMBODIMENTS OF THE INVENTION

Figure 1:
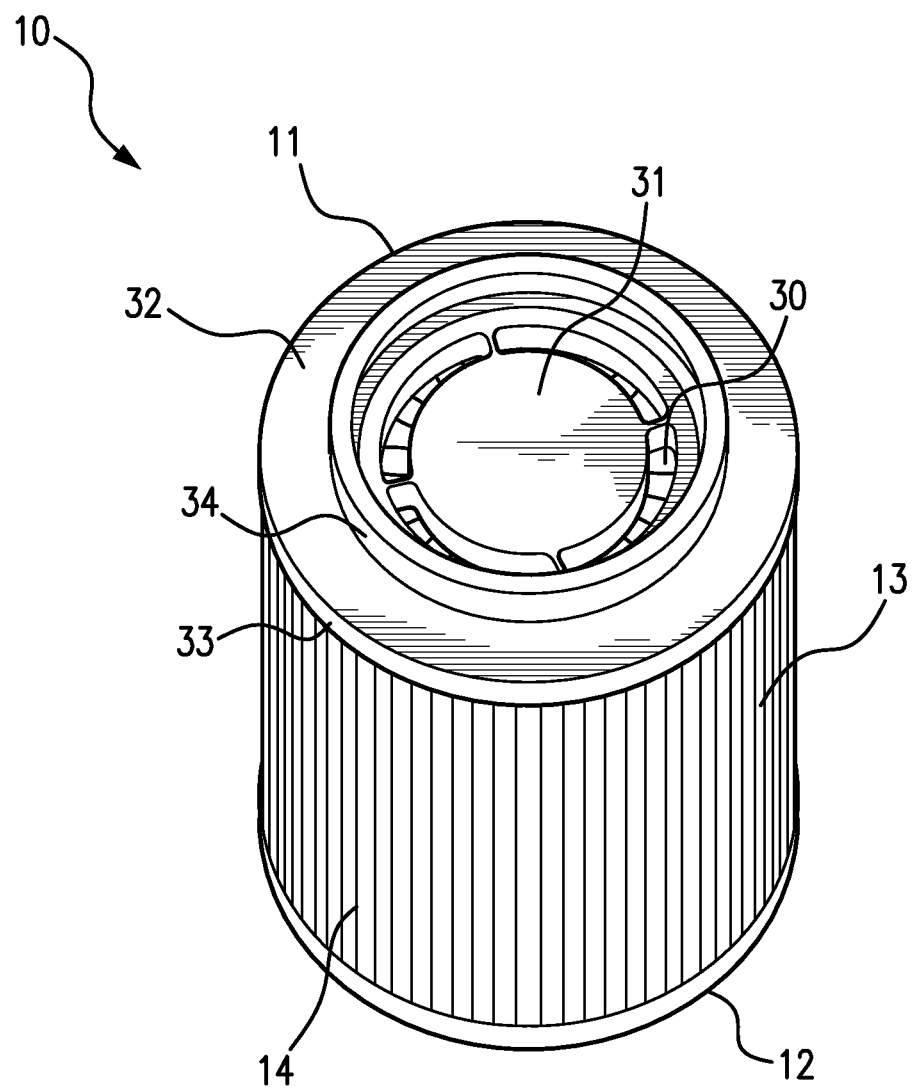
FIG. 1 is a perspective view of a filter element embodying the invention.

Filter elements embodying the invention may be configured in a wide variety of ways. One of many different examples of a filter element 10 embodying the invention is shown in FIGS. 1-4. Generally, the filter element 10 may comprise a central longitudinal axis A, a first end cap 11 and a second end cap 12, and a filter structure 13 extending between the end caps 11, 12. The filter structure 13 may have opposite axial ends, and the end caps 11, 12 may be attached to the ends of the filter structure 13. Further, the filter structure may include a plurality of coaxially nested filter packs and a helical support positioned between adjacent filter packs. For example, the filter structure 13 may include an inner filter pack 15, for example, an innermost filter pack, and an adjacent outer filter pack 14. A helical support 16 may be positioned between the outer and inner filter packs 14, 15.

Each filter pack may be variously configured. For example, both the outer and inner filter packs 14, 15 may have a generally cylindrical shape, and the cylindrical filter packs 14, 15 may have any of numerous polygonal cross sections, including a circular cross section. Each cylindrical filter pack 14, 15 may further include first and second opposite axial ends, inner and outer peripheries, and a hollow interior which may span the axial length of each filter pack 14, 15. The inner filter pack 15 may, for example, be positioned coaxially within the outer filter pack 14 and may have an outer diameter at the outer periphery which is smaller than the inner diameter at the inner periphery of the outer filter pack 14, defining a space, e.g., an annular space, between them.

Figure 2:
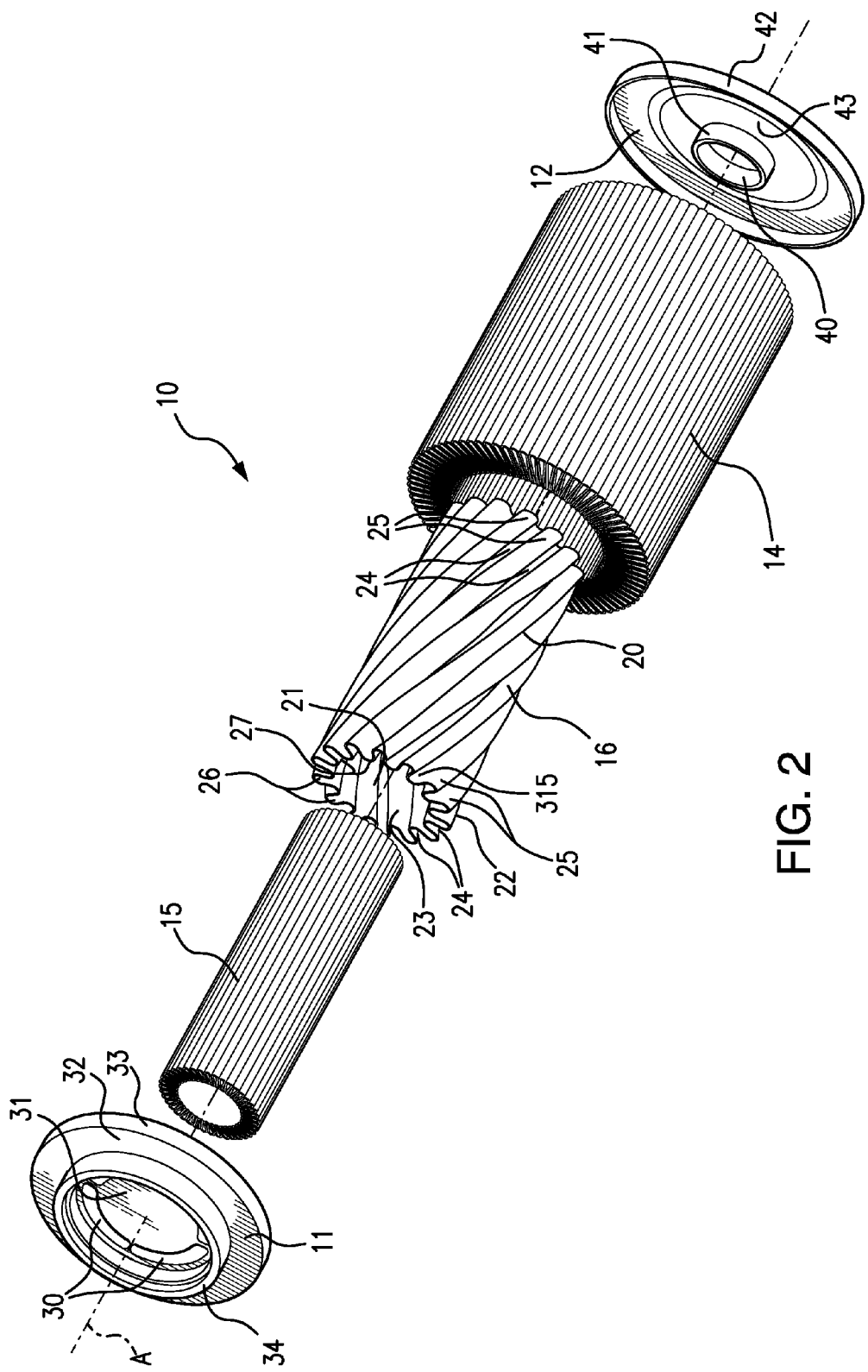
FIG. 2 is an exploded view of the filter element of FIG. 1.
Figure 3:
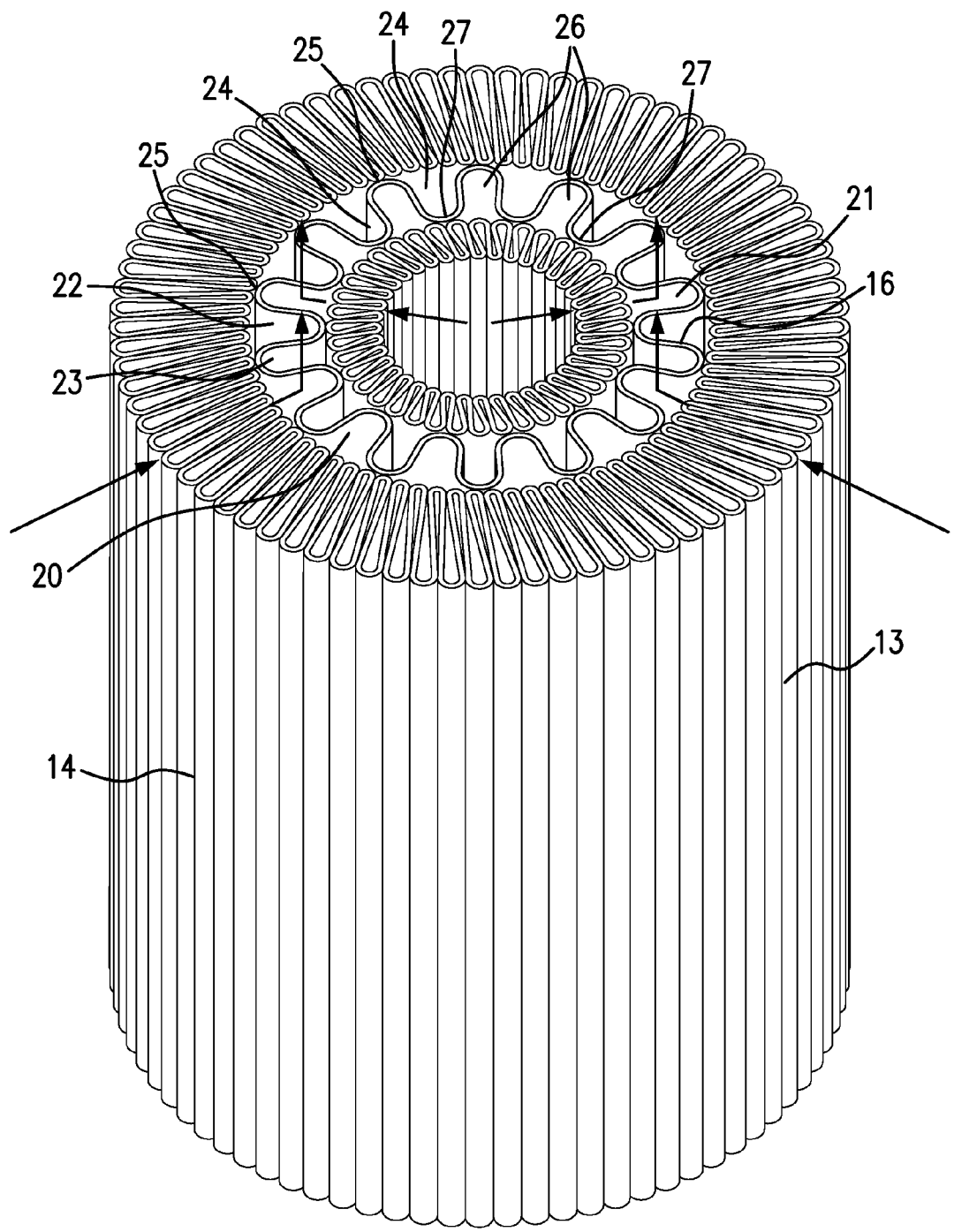
FIG. 3 is a perspective view of the filter structure of FIG. 1 with arrows showing one example of a flow pattern through the filter structure.

One or both of the filter packs may be pleated or nonpleated. Nonpleated filter packs may be variously configured, including, for example, as a hollow, cylindrical mass of fibers or a permeable sheet, membrane, or strip spirally or helically wrapped to form a hollow, cylindrical structure. Pleated filter packs may also be variously configured. For example, both the outer and inner filter packs 14, 15 may include a plurality of pleats extending generally axially between the opposite ends of the filter packs 14, 15. The pleats may include crests at the outer periphery of the filter packs 14, 15, roots at the inner periphery of the filter packs 14, 15, and a pair of pleat legs extending between each crest and root. The pleated filter packs may be variously pleated. For example, one or both filter packs may have fan-type pleats where the height of each pleat is substantially equal to the radial distance between the crests and the roots. Alternatively, as shown in FIGS. 2 and 3, one or both filter packs 14, 15 may have laid over-type pleats where the height of each pleat is greater than the radial distance between the crests and the roots. U.S. Pat. No. 5,543,047 and U.S. Pat. No. 5,252,207 are incorporated by reference to provide additional support for laid over-type and fan-type pleats as well as other aspects of the filter element.

Regardless of the type of pleat, the pleat heights of the outer filter pack 14 and the inner filter pack 15 may be approximately equal to one another or may be different from one another, e.g., the height of the pleats of the outer filter pack 14 may be greater than or less than the height of the pleats of the inner filter pack 15. For many embodiments, the ratio of the pleat heights between the outer and inner filter packs 14, 15 can be varied, for example, according to specific characteristics of the fluid being filtered. For example, viscous fluids may be filtered with shorter pleat heights in which the ratio of the outer to inner filter pack pleat heights may be in a range from about 1:0.75 to about 1:1.25. However, for less viscous fluids, a ratio in the range from about 1:1 to about 2:1 may be useful.

Each filter pack, whether pleated or nonpleated, includes a filter medium which can remove one or more substances from a fluid flowing through the filter medium. The filter pack may be formed from a single layer comprising the filter medium or from a composite of two or more layers in which at least one layer comprises the filter medium. For example, a layer of the filter medium may be sandwiched between two drainage layers. The filter medium may be fashioned in a variety of forms from any of numerous materials. For example, the filter medium be in the form of a permeable woven or nonwoven fibrous sheet, a permeable supported or unsupported membrane, or a permeable fibrous mass and may be fashioned from glass fibers or natural or synthetic polymers, including polymeric fibers or permeable polymeric sheets. The filter medium may be permeable, e.g., may be porous, semipermeable, or permselective and may have a constant or graded pore structure. Further, the filter medium may have, or may be modified to have, any of a myriad of filtration characteristics. For example, the filter medium may have any of a wide range of molecular cutoffs or removal ratings, e.g., from ultraporous or nanoporous or finer to microporous or coarser, to remove particulates, such as solids, gels, and colloidal particles, or large molecules from the liquids. Alternatively or additionally, the filter medium may have a positive or negative electrical charge or polarity; may be liquiphobic or liquiphilic, including hydrophobic or hydrophilic or oleophobic or oleophilic; and/or may have one or more attached functional groups, such as ligands or any other reactive moiety, to remove one or more chemical substances from the liquids. For many, but not all, embodiments, the filter media of both filter packs may have similar filtering characteristics.

The helical support 16 may be positioned in the space between the outer and inner filter packs 14, 15, separating the outer and inner filter packs 14, 15. The helical support 16 may serve to support the outer filter pack 14 against forces directed radially inwardly and to support the inner filter pack 15 against forces directed radially outwardly. For many embodiments, the helical support 16 may serve to more efficiently direct filtrate away from the outer and inner filter packs 14, 15 with a lower pressure drop. For other embodiments, the helical support may serve to direct unfiltered fluid to the outer and inner filter packs.

The helical support 16 may have a hollow, cylindrical shape that includes opposite axial ends, an outer surface 20, and an inner surface 21. The outer surface 20 may comprise a series of parallel adjacent grooves 22 positioned around the outer periphery of the helical support 16, each outer groove 22 extending helically between the opposite axial ends of the helical support 16. Similarly, the inner surface may comprise a series of parallel adjacent grooves 23 positioned around the inner periphery of the helical support 16, each inner groove extending helically between the opposite axial ends of the helical support 16. The outer grooves 22 may form adjacent parallel helical flow channels 24 and helical support ridges 25 along the outer surface 20 of the helical support 16, while the inner grooves 23 may form adjacent parallel helical flow channels 26 and helical support ridges 27 along the inner surface 21 of the helical support 16. For many embodiments, the flow channels on one surface of the helical support may form the support ridges on the other surface. The helical support 16 may be positioned between the outer and inner filter packs 14, 15 with the support ridges 25 on the outer surface 20 of the helical support 16 contacting and supporting the inner periphery of the outer filter pack 14, e.g., contacting and supporting the roots of the pleats along the inner diameter of the outer filter pack 14, and with the support ridges 27 on the inner surface 21 of the helical support 16 contacting and supporting the outer periphery of the inner filter pack 15, e.g., contacting and supporting the crests of the pleats along the outer diameter of the inner filter pack 15. Further, the flow channels 24 on the outer surface 20 of the helical support 16 may be fluidly isolated from the flow channels 26 on the inner surface 21. For example, the helical support 16 may be impermeable and non-perforated to maintain separation of the fluid flow along the flow channels 24, 26 on the outer and inner surfaces 20, 21 of the helical support 16.

Figure 4:
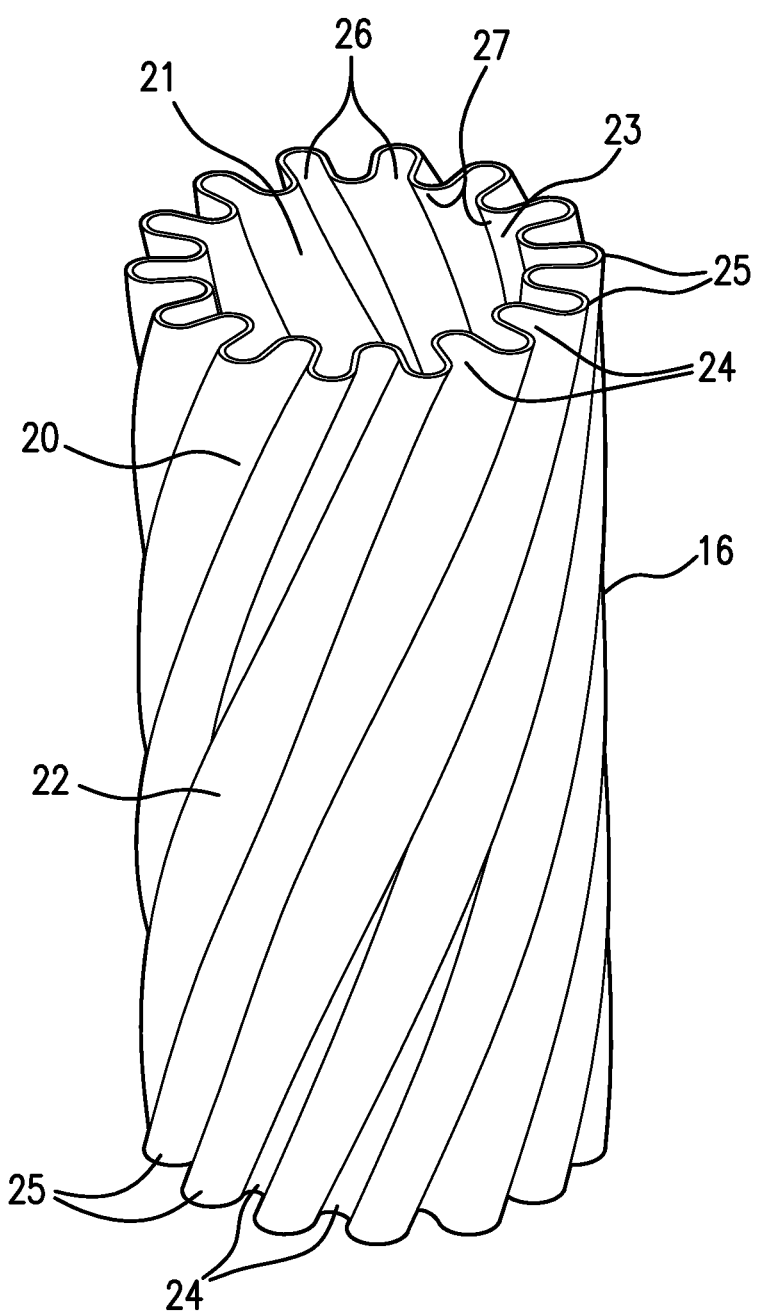
FIG. 4 is a perspective view of the helical support of the filter structure of FIG. 3.

The number and dimensions of the grooves 22, 23, including the number and dimensions of the support ridges 25, 27 and flow channels 24, 26, can be varied, for example, according to the specific parameters associated with the application of the filter element, e.g., the desired flow rate and pressure drop through the filter element and the nature of the fluid. For example, the width and/or depth of the flow channels may be the same on the inner surface as the outer surface or may be different. The width and/or depth of the flow channels on any one surface may be the same or different. Further, the width and/or depth of the flow channels 24, 26 may be larger or smaller, or may be tapered, to correlate with the anticipated fluid flow rate through the filter packs 14, 15, thereby adequately draining the filter packs with a lower pressure drop. Similarly, the width of the support ridges 25, 27 may be larger or smaller to correlate with the anticipated pressure drop, and the associated radial forces, across the filter packs 14, 15. As shown in FIGS. 3 and 4, the shape of the grooves 22, 23 and, in particular, the shape of the support ridges 25, 27 in cross-section may be curved or rounded, providing a generally arch-shaped support against any pinching forces associated with the pressure drops accompanying outside-in flow and inside-out flow through the outer and inner filter packs 14, 15. An arch-shaped support advantageously provides better support against the forces associated with the pressure drops than other shaped structures, e.g., flat square wave structures. The helical support may be fashioned from any of a variety of materials, including polymeric materials. Because the arch shape of the support provides superior support, the helical support may be fashioned from thinner, lighter weight polymeric materials.

The end caps serve to direct fluid through the filter element and may be configured in any of numerous ways. For example, in the embodiment illustrated in FIGS. 1 and 2, each end cap 11, 12 may be a unitary piece attached to an end of the filter structure 13, e.g., to the corresponding ends of all three of the inner filter pack 15, the helical support 16, and the outer filter pack 14. Alternatively, one or both end caps may have a multi-piece structure. At least one of the end caps may include an opening fluidly communicating between the flow channels at that end of the helical support and the exterior of the filter element. For example, the first end cap 11 at one end of the filter structure 13 may have a generally annular shaped opening 30 which fluidly communicates between the flow channels 24, 26 on both surfaces 20, 21 of the helical support 16 and the exterior of the filter element 10. The central region 31 of the first end cap 11 within the annular opening 30 may serve as a blind end piece attached to one end of the inner filter pack 15, sealing that end of the inner filter pack 15 and the hollow interior of the inner filter pack 15. The outer region 32 of the first end cap 11 outside the annular opening 30 may serve as an end piece attached to the corresponding end of the outer filter pack, sealing that end of the outer filter pack 14. Ribs extending across the annular opening 30 may connect the outer region 32 and the central region 31 of the first end cap 11 and maintain the helical support 16 in place axially between the outer and inner filter packs 14, 15. An axially protruding exterior lip 33 may contact a portion of the outer periphery of the outer filter pack 14 and serve to maintain the relative coaxial positions of the outer filter pack 14, the helical support 16, and the inner filter pack 15. Further, the first end cap 11 may include a fitting for coupling the filter element 10 to a corresponding fitting on a housing (not shown). For example in the illustrated embodiment the first end cap 11 may include a ring-shaped axially outwardly extending protrusion 34 arranged to fit around and seal against the exterior of a pipe or nipple of the housing.

At least one of the end caps may have an opening which fluidly communicates between the interior of the inner filter pack and the exterior of the filter element. For example, the second end cap 12 at the opposite end of the filter structure 13 may have a generally circular central opening 40 which fluidly communicates with the hollow interior of the inner filter pack 15. An axially protruding internal lip 41 may surround the central opening 40. The internal lip 41 may contact a portion of the inner periphery of the inner filter pack 15 and serve to maintain the relative position of the inner filter pack 15. The second end cap 12 may also include an axially protruding exterior lip 42 which may contact a portion of the outer periphery of the outer filter pack 14 and serve to maintain the relative position of the outer filter pack 14, the helical support 16, and the inner filter pack 15. The annular region 43 of the second end cap 12 between the internal and external lips 41, 42 may serve as an end piece attached to the corresponding ends of the inner filter pack 15, the helical support 16, and the outer filter pack 14, sealing the corresponding ends of the inner filter pack 15, the helical support 16, and the outer filter pack 14. The second end cap 12 may be positioned at one end of the flow channels 24, 26 and may thus seal that end of the flow channels 24, 26, preventing fluid from entering or exiting the flow channels 24, 26 at that end.

The filter element 10 may be assembled in any of numerous ways. For example, filter structure 13 may be formed by axially moving the helical support 16 along the outer periphery of the inner filter pack 15, or axially inserting the inner filter pack 15 within the interior of the helical support 16. The inner filter pack 15 may then be nested within the helical support 16 with the arch-shaped support ridges 27 on the inner surface 21 of the helical support 16 contacting the outer periphery of the inner filter pack 15. Where the inner filter pack 15 is pleated, the helical support 16 may support the pleats and maintain the pleats in position without the use of any additional outer retainer, such as an outer cage or external wrap, thereby reducing the weight and the amount of materials associated with the filter element 10. Alternatively, the inner filter pack may include an outer retainer which may contact the inner surface of the helical support. The outer filter pack 14 may then be axially moved along the outer periphery of the helical support 16, or the nested helical support 16 and inner filter pack 15 may be axially inserted within the interior of the outer filter pack 14. The helical support 16 and the inner filter pack 15 may then be nested within the outer filter pack 14 with the support ridges 25 on the outer surface 20 of the helical support 16 contacting the inner periphery of the outer filter pack 14. Where the outer filter pack 14 is pleated, the helical support 16 may support the pleats and maintain the pleats in position without the use of an additional perforated core, thereby further reducing the weight and amount of materials associated with the filter element 10. Alternatively, the outer filter pack may include a perforated core which may contact the outer surface of the helical support. Alternatively, the filter structure 13 may be formed by first fitting the outer filter pack 14 around the helical support 16 and then fitting the inner filter pack 15 within the helical support 16. For many, but not all, embodiments the filter structure 13 may be formed with the corresponding ends of the outer filter pack 14, helical support 16, and inner filter pack 15 radially aligned with one another to provide axial ends of the filter structure 13 which are generally flat.

The end caps 11, 12 may then be attached in a variety of ways to the axial ends of the filter structure 13, including at least the outer and inner filter packs 14, 15 and, for many embodiments, the helical support 16 as well. For example, the end caps 11, 12 may be filled with a potting compound, such as an epoxy, a polyurethane, or other adhesive, and the axial ends of the filter structure 13 may be set in the potting compound, thereby adhesively bonding the axial ends of the filter structure 13 to the end caps 11, 12. Alternatively, the end caps 11, 12 may be solvent-bonded or heat-bonded to the axial ends of the filter structure 13. For example, where the end caps 11, 12 are fashioned from a polymeric material, the portion of each end cap 11, 12 facing the axial end of the filter structure 13 may be melted, and the axial ends of the filter structure 13 may be set in the molten polymer of the end caps 11, 12, thereby heat-bonding the axial ends of the filter structure 13 to the end caps 11, 12. Once the end caps 11, 12 are attached to the filter structure 13, the filter element 10 is formed and ready for use.

Fluids may be filtered in a number of ways in accordance with methods embodying the invention. For example, a filter element may be positioned in any of a variety of differently configured housings (not shown). The housing may include at least one inlet for directing unfiltered fluid, e.g., feed fluid or process fluid, into the housing and at least one outlet for directing filtered fluid, e.g., filtrate or permeate, out of the housing. The housing may define a fluid flow path within the housing between the inlet and the outlet, and the filter element may be mounted in the fluid flow path in the housing. The operating parameters may vary widely from one application to another. For example, the operating temperature may be in the range up to about 2700° F. or more, and the operating pressure may be in the range up to about 10000 psi or more.

A filter element may be used to filter a fluid in any of numerous ways. For example, methods for filtering a fluid may include passing an unfiltered fluid into the hollow interior of an inner filter pack along a central longitudinal axis and directing the unfiltered fluid generally radially inside-out from the inner periphery of the inner filter pack through a filter medium to the outer periphery of the inner filter pack. The methods may also include simultaneously directing an unfiltered fluid generally radially outside-in from the outer periphery of an outer filter pack through a filter medium to the inner periphery of the outer filter pack. Directing the unfiltered fluid through a filter media of the inner and outer filter packs may include removing one or more substances from the unfiltered fluid and forming a filtrate at the outer periphery of the inner filter pack and the inner periphery of the outer filter pack.

For example, within the housing unfiltered fluid may be directed into the central opening 40 of the second end cap 12 on one end of the filter element 10 and axially along the central longitudinal axis A into the interior of the inner filter pack 15. The central region 31 of the first end cap 11 at the other end of the filter element 10 may block further axial flow of the unfiltered fluid, forcing the unfiltered fluid generally radially inside-out through the inner filter pack 15, including the filter medium of the inner filter pack 15. As the fluid passes through the inner filter pack 15, a differential pressure develops between the inner and outer peripheries of the inner filter pack 15. The associated radially outwardly directed forces press the outer periphery of the inner filter pack 15 against the helical support ridges 27 on the inner surface 21 of the helical support 16. Where the inner filter pack 15 is pleated, these forces may press the crests of the pleats at the outer periphery of the inner filter pack 15 against the helical support ridges 27 on the inner surface 21 of the helical support 16.

At the same time that unfiltered fluid is directed inside-out through the inner filter pack 15, unfiltered fluid within the housing may be directed generally radially outside-in through the outer filter pack 14, including the filter medium of the outer filter pack 14, again as shown in FIG. 4. As the fluid passes through the outer filter pack 14, a differential pressure develops between the outer and inner peripheries of the outer filter pack 14. The associated inwardly directed forces press the inner periphery of the outer filter pack 14 against the helical support ridges 25 on the outer surface 20 of the helical support 16. Where the outer filter pack 14 is pleated, these forces may press the roots of the pleats at the inner periphery of the outer filter pack 14 against the helical support ridges 25 on the outer surface 20 of the helical support 16.

The oppositely directed radial forces generated within the outer and inner filter packs 14, 15 are sturdily resisted by the helical support ridges 25, 27 on the outer and inner surfaces 20, 21 of the helical support 16, respectively. Because the helical support ridges 25, 27 have a generally arch-shaped configuration, the support ridges 25, 27 are inherently strong, allowing the helical support 16 to be fashioned from thinner, lighter weight materials, e.g., polymeric materials, and allowing the helical support 16 to be the sole inner support structure for the outer filter pack 14 and the sole outer support structure for the inner filter pack 15, without sacrificing any structural integrity.

Methods for filtering a fluid may further include passing the filtrate from the inner periphery of the outer filter pack along a plurality of flow channels which extend helically along an outer surface of the helical support and, at the same time, passing filtrate from the outer periphery of the inner filter pack along a plurality of flow channels which extend helically along an inner surface of the helical support. Passing the filtrate along the flow channels on the outer surface of the helical support may include passing the filtrate along the helical flow channels to one end, or both ends, of the helical support. Similarly, passing the filtrate along the flow channels on the inner surface of the helical support may include passing filtrate along the helical flow channels to one end, or both ends, of the helical support.

For example, methods for filtering a fluid may include passing the filtrate from the inner periphery of the outer filter pack 14 along a plurality of helical flow channels 24 on the outer surface 20 of the helical support 16 positioned between the outer and inner filter packs 14, 15. The filtrate may pass generally axially along the helical flow channels 24 on the outer surface 20 to one or both ends of the helical support 16. For example, in the illustrated embodiment, the filtrate from the outer filter pack 14 may flow generally axially along the helical flow channels 24 on the outer surface 20 to only one end of the helical support 16, e.g., the end at the first end cap 11 and through the annular shaped opening 30, the helical flow channels 24 being sealed at the opposite end of the helical support 16 by the second end cap 12.

Methods for filtering a fluid may also include passing the filtrate from the outer periphery of the inner filter pack 15 along a plurality of helical flow channels 26 on the inner surface 21 of the helical support 16. The filtrate may pass generally axially along the helical flow channels on the inner surface to one or both ends of the helical support. For example, in the illustrated embodiment, the filtrate from the inner filter pack 15 may flow generally axially along the helical flow channels 26 to only one end of the helical support 16, i.e., again, the end at the first end cap 11 and through the annular shaped opening 30, the helical flow channels 26 being sealed at the opposite end of the helical support 16 by the second end cap 12.

For many embodiments, the filtrate flowing through the flow channels 26 on the inner surface 21 of the helical support 16 may be isolated from the filtrate flowing through the helical flow channels 24 on the outer surface 20 of the helical support 16 along some, most, or all of the axial length of the helical support 16. For example, in the illustrated embodiment, the helical support 16 may be impermeable and non-perforated, isolating the filtrate on the outer surface 20 of the helical support 16 from the filtrate on the inner surface 21 along the entire axial length of the helical support 16. By isolating the filtrate on opposite surfaces of the helical support, fluid flow along the helical flow channels 24, 26 remains less turbulent, providing less resistance to flow and a lower pressure drop along the length of the helical support 16.

Methods for filtering a fluid may further comprise discharging the filtrate from the flow channels. Depending on the configuration of the end caps, the filtrate on the outer surface of the helical support may be discharged at one or both ends of the helical support, the filtrate on the inner surface of the helical support may be discharged at one or both ends of the helical support, and the filtrate on one surface of the helical support may be discharged at the same end as the filtrate on the other surface or at the opposite end. In the illustrated embodiment, the filtrate flow channels 24, 26 on both surfaces 20, 21 of the helical support 16 fluidly communicate with the annular shaped opening 30 in the first end cap 11. Consequently, filtrate from both the inner and outer filter packs 14, 15 may be discharged to the exterior of the filter element 10 through the annular shaped opening 30 in the first end cap 11, which may be coupled to a filtrate outlet of the housing.

While various aspects of the invention have been described and/or illustrated with respect to several embodiments, the invention is not limited to these embodiments. For instance, one or more features of any embodiment may be eliminated or modified or one or more features of one embodiment may be combined with one or more features of other embodiments without departing from the scope of the invention. Even embodiments with very different features may be within the scope of the invention. For example, for some embodiments, the outer filter pack may be pleated and may include an outer retainer, such as a perforated cage or a circumferential or helical wrap, to support the pleats and maintain the pleats in place. For some embodiments, a perforated core may be positioned in the interior of the inner filter pack. The perforated core may be attached to the end caps, or it may protrude from the housing and extend into the interior of the inner filter pack through the central opening in the second end cap.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise contradicted by context. The use of any and all examples, or exemplary language (e.g., "such as," "for example", or "e.g.") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter element comprising:
a filter structure having opposite first and second ends; the filter structure includes a generally cylindrical inner filter pack having a filter medium, an inner periphery, an outer periphery, a plurality of axially extending pleats having pleat crests at the outer periphery of the inner filter pack, pleat roots at the inner periphery of the inner filter pack, and a pleat height that is substantially equal to or greater than the distance between the pleat crests and the pleat roots, and a hollow interior; a generally cylindrical outer filter pack positioned around the inner filter pack and having a filter medium, an inner periphery, an outer periphery, a plurality of axially extending pleats having pleat roots at the inner periphery of the outer filter pack, pleat crests at the outer periphery of the outer filter pack, and a pleat height that is substantially equal to or greater than the distance between the pleat crests and the pleat roots; wherein a ratio of the outer pack pleat heights to the inner pack pleat heights is about 1:0.75 to about 2:1; and a generally cylindrical impermeable and non-perforated helical support having first and second ends, an inner surface, an outer surface, and a plurality of support ridges and flow channels on the inner and outer surfaces extending generally helically between the first and second ends of the helical support; the support ridges having a rounded or curved cross-section providing an arch-shaped configuration, wherein the helical support is positioned between the inner and outer filter packs; the arch-shaped support ridges on the inner surface of the helical support contacting the pleat crests of the inner filter pack and the arch-shaped support ridges on the outer surface of the helical support contacting the pleat roots of the outer filter pack, wherein the flow channels on the inner surface of the helical support are fluidly isolated from the flow channels on the outer surface of the helical support along the entire length of the helical support;
first and second end caps attached to the first and second ends of the filter structure;
a first opening in at least one of the first and second end caps which fluidly communicates between the flow channels of the helical support and an exterior of the filter element; and
a second opening in at least one of the first and second end caps which fluidly communicates between the interior of the inner filter pack and the exterior of the filter element.

2. The filter element of claim 1 wherein the first end cap includes the first opening fluidly communicating between the flow channels at one end of the helical support and the exterior of the filter element and wherein the second end cap seals the flow channels at the second end of the helical support.

3. The filter element of claim 1 wherein each end cap comprises a unitary piece extending across corresponding ends of the outer filter pack, the inner filter pack, and the helical support.

4. The filter element of claim 1 wherein the first opening comprises a generally annular shaped opening in the first end cap.

5. The filter element of claim 1 wherein the second opening comprises a central opening in the second end cap.

6. The filter element of claim 1 wherein the pleats are laid over-type pleats.

7. A method of filtering a fluid through a filter element comprising:
- a filter structure having opposite first and second ends; the filter structure includes a generally cylindrical inner filter pack having a filter medium, an inner periphery, an outer periphery, a plurality of axially extending pleats having pleat crests at the outer periphery of the inner filter pack, pleat roots at the inner periphery of the inner filter pack, and a pleat height that is substantially equal to or greater than the distance between the pleat crests and the pleat roots, and a hollow interior; a generally cylindrical outer filter pack positioned around the inner filter pack and having a filter medium, an inner periphery, an outer periphery, a plurality of axially extending pleats having pleat roots at the inner periphery of the outer filter pack, pleat crests at the outer periphery of the outer filter pack, and a pleat height that is substantially equal to or greater than the distance between the pleat crests and the pleat roots; wherein a ratio of the outer pack pleat heights to the inner pack pleat heights is about 1:0.75 to about 2:1; and a generally cylindrical impermeable and non-perforated helical support having first and second ends, an inner surface, an outer surface, and a plurality of support ridges and flow channels on the inner and outer surfaces extending generally helically between the first and second ends of the helical support; the support ridges having a rounded or curved cross-section providing an arch-shaped configuration, wherein the helical support is positioned between the inner and outer filter packs; the arch-shaped support ridges on the inner surface of the helical support contacting the pleat crests of the inner filter pack and the arch-shaped support ridges on the outer surface of the helical support contacting the pleat roots of the outer filter pack, wherein the flow channels on the inner surface of the helical support are fluidly isolated from the flow channels on the outer surface of the helical support along the entire length of the helical support;
- first and second end caps attached to the first and second ends of the filter structure;
- a first opening in at least one of the first and second ends caps which fluidly communicates between the flow channels of the helical support and an exterior of the filter element; and
- a second opening in at least one of the first and second end caps which fluidly communicates between the interior of the inner filter pack and the exterior of the filter element;

the method comprising:
- directing unfiltered fluid into the hollow interior of the cylindrical inner filter pack and passing the unfiltered fluid generally radially from the inner periphery of the inner filter pack to the outer periphery of the inner filter pack, including passing the unfiltered fluid through the plurality of pleats of the inner filter pack to remove one or more substances from the unfiltered fluid and pressing the pleat crests of the inner filter pack against the support ridges on the inner surface of the helical support and providing a filtrate at the outer periphery of the inner filter pack;
- passing an unfiltered fluid generally radially from the outer periphery of the outer filter pack to the inner periphery of the outer filter pack surrounding the inner filter pack, including passing the unfiltered fluid through the plurality of pleats of the outer filter pack to remove one or more substances from the unfiltered fluid and pressing the pleat roots of the outer filter pack against the support ridges on the outer surface of the helical support and providing a filtrate at the inner periphery of the outer filter pack;
- passing the filtrate from the outer periphery of the inner filter pack along the plurality of flow channels which helically extend along the inner surface of the helical support positioned between the inner and outer filter packs, including passing the filtrate helically along the flow channels to at least one end of the helical support and discharging the filtrate from the flow channels; and
- passing the filtrate from the inner periphery of the outer filter pack along the plurality of flow channels which helically extend along the outer surface of the helical support, including passing the filtrate helically along the flow channels on the outer surface to at least one end of the helical support and discharging the filtrate from the flow channels.

8. The method of claim 7 wherein passing the unfiltered fluid from the inner periphery of the inner filter pack to the outer periphery of the inner filter pack includes pressing the outer periphery of the inner filter pack against the support ridges which helically extend along the inner surface of the helical support.

9. The method of claim 7 wherein discharging the filtrate from the flow channels on the inner and outer surfaces of the helical support includes discharging the filtrate at the same end of the helical support.

10. The method of claim 7 wherein passing the filtrate from the outer periphery of the inner filter pack along the flow channels on the inner surface of the helical support and passing the filtrate from the inner periphery of the outer filter pack along the helical flow channels on the outer surface of the helical support includes isolating the filtrate from the outer periphery of the inner filter pack and the filtrate from the inner periphery of the outer filter pack on opposite surfaces of the helical support.

11. The filter element of claim 1 wherein the ratio of the outer pack pleat heights to the inner pack pleat heights is about 1:0.75.

12. The filter element of claim 1 wherein the ratio of the outer pack pleat heights to the inner pack pleat heights is about 2:1.

13. The filter element of claim 1 wherein the ratio of the outer pack pleat heights to the inner pack pleat heights is about 1:1.25.

14. The filter element of claim 2, wherein the first end cap includes a ring-shaped axially outwardly extending protrusion for coupling the filter element to a housing, the housing having a pipe or a nipple, wherein the protrusion is arranged to seal against an exterior of the pipe or the nipple; and the second end cap includes an axially protruding internal lip contacting a portion of the inner periphery of the inner filter pack to maintain a relative position of the inner filter pack, and an axially protruding exterior lip contacting a portion of the outer periphery of the outer filter pack to maintain a relative position of the outer filter pack.

\* \* \* \* \*